Aug. 6, 1968   Z. R. MOCARSKI   3,395,497

CUT-OFF FIXTURE

Filed March 7, 1966

INVENTOR.
Zenon R. Mocarski
BY
Johnson and Kline
ATTORNEYS

United States Patent Office 3,395,497
Patented Aug. 6, 1968

3,395,497
CUT-OFF FIXTURE
Zenon Romuald Mocarski, Shelton, Conn.
(1245 Kings Highway E., Fairfield, Conn. 06430)
Filed Mar. 7, 1966, Ser. No. 532,220
6 Claims. (Cl. 51—231)

ABSTRACT OF THE DISCLOSURE

A cut-off fixture for enabling workpieces of constant length to be cut from a piece of stock by the use of a cut-off saw blade in which the blade cuts its own stabilizing slot in the fixture and an adjustable, calibrated stop is provided which by adjustment enables the setting of the length between the slot and the stop for the workpieces after accommodating for the difference between the length of a trial workpiece and the desired length of the workpieces.

---

In many instances, it has been found necessary to provide individual pieces of substantially constant length, i.e., within one thousandths of an inch. Normally these are formed by cutting a stock length of small diameter rod or tubing into the individual pieces, one at a time. If a large number of pieces are required, automatic machinery is generally available to cut the stock and provide the pieces. However, where only a few pieces are required and automatic machinery is too expensive to set up or unavailable, it has been difficult for an operator to cut such pieces simply, economically and to a substantially constant desired length with conventionally available machinery.

It is accordingly an object of the present invention to provide a cut-off fixture which enables a user to individually cut pieces of substantially identical length from a stock length of material, easily and economically by using a thin, cut-off saw blade.

Another object of the present invention is to provide for stabilizing the saw blade as it cuts each piece.

A further object of the present invention is to enable the fixture to be easily and quickly set to provide the desired length of the pieces with a minimum of trial, error and cutting of experimental pieces.

Still another object of the present invention is to provide a cut-off fixture which achieves the above objects but yet which is extremely simple in construction, reliable in use and readily adapted to different lengths of pieces.

In carrying out the present invention, the fixture is preferably used with a conventional surface grinder that has a magnetic bed positioned beneath an arbor to which is secured a thin, cut-off saw, such as an abrasive wheel, of perhaps 1/16 of an inch thickness or less. The fixture includes a base that is releasably secured on the bed to be immovable with respect thereto. Mounted on the base are pairs of bushings that support shafts, the latter being attached to a worktable so that the worktable is capable of reciprocating with respect to the base. The worktable is formed to provide a groove preferably transverse to the shafts and in which a length of material is adapted to be positioned and held to have individual pieces cut therefrom by the saw. Located between the saw and the groove is a part of a worktable which is initially solid but in which the saw blade initially forms a slit with the slit thereafter serving to stabilize the saw blade as it cuts each piece.

For enabling a user to initially adjust the fixture to have each piece cut to the same desired length, there is provided a stop means secured on the worktable and having an end that extends adjacent an end of the groove. The movement of the end is calibrated and it is set with respect to the slit formed by the cut-off wheel to have the distance therebetween equal to the length which each piece is desired to have.

Other features and advantages will hereinafter appear.

Figure 1:
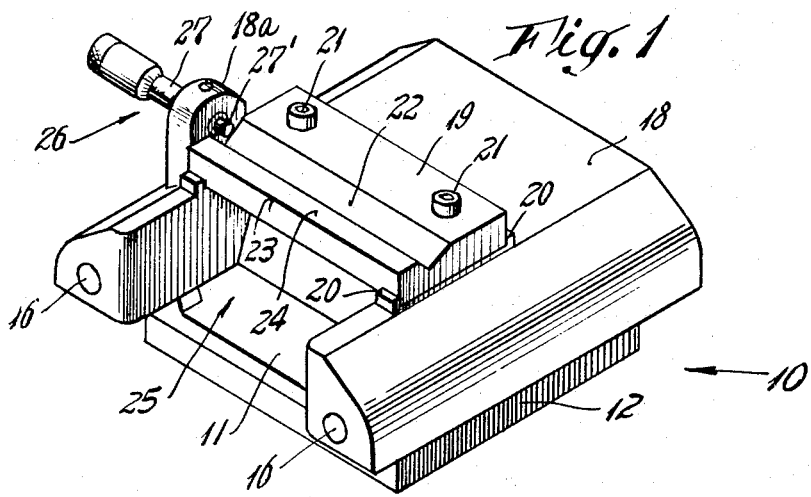
FIGURE 1 is a perspective view of the cut-off fixture of the present invention.
Figure 2:
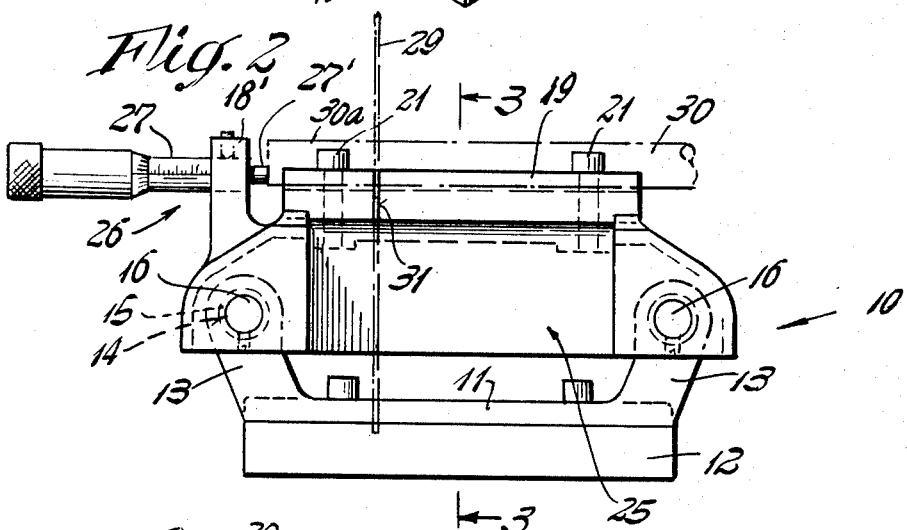
FIG. 2 is a front view thereof.

Referring to the drawing, the cut-off fixture is generally indicated by the reference numeral 10 and includes a base 11 which consists of a flat steel plate 12 to which is secured a bracket 13 having apertures 14 into which bushings 15 are positioned. Preferably there are four apertures, each of which contains a bushing. Reciprocally mounted in each pair of apertures 14 is a shaft 16 with the ends of the shafts being supported in depending side walls 17 of an inverted box-like worktable 18. With such a construction it will be appreciated that the worktable 18 may accordingly reciprocate with respect to the base 11, with the shafts 16 sliding in the bushings 15.

The worktable includes a removable work support 19 that is shaped to accurately fit within locating abutments 20 formed in the table 18 and be releasably held therein as by screws 21. A modified V-groove 22 is formed in the upper surface of the support 19 and extends transversely to the axis of the shafts 16. In the instant embodiment the groove is perpendicular to the shafts 16 and hence perpendicular to the direction of reciprocation of the worktable on the base though if desired it may be placed at a different angle thereto if an angular cut is desired. The groove 22 may have other than a modified V shape in cross-section, such as a semi-spherical shape if desired but with any cross-sectional configuration, there is formed between a forward edge 23 of the support 19 and the groove, a stabilizing portion 24 for reasons which will be hereafter apparent.

As shown in the drawing, the worktable 18 is formed to provide a recess, generally indicated by the reference numeral 25, between the two shafts which relieves the worktable 18 beneath the groove to prevent cutting thereof during use by a saw blade. With this construction, the groove is thus located between the pairs of apertures and thus has at least one aperture ahead of it to provide for accurate and dependable supporting of the worktable.

A stop means 26 is supported in a projection 18' integrally formed in the worktable and in the instant embodiment the stop means 26 includes a micrometer screw 27 having an end 27'. The end of the screw is positioned to be moved along the axis of the groove proximate to the adjacent end of the groove. As the micrometer 27 is calibrated, the distance that the end 27' moves may thus be accurately set.

In use, the fixture is preferably mounted on a magnetic bed 28 of a surface grinder adjacent a thin blade abrasive cut-off saw diagrammatically represented by the arm 29 with the edge 23 being at a desired angle with the edge of the saw blade, such as perpendicular thereto. The center of the saw blade is at least level with but preferably is above the workpiece such that the force of the blade is in a direction to maintain the workpiece in the groove. While the fixture may be secured on the bed 28 in any desired manner, in the present embodiment the bed 28 is magnetic and attracts the steel plate 12 to hold the same immovable on the bed. A user initially positions a length of material 30 from which it is desired to provide individual pieces of substantially constant length in the groove. The end 27' is set so that a test piece that is cut from the length 30 will be approximately the desired size.

Figure 3:
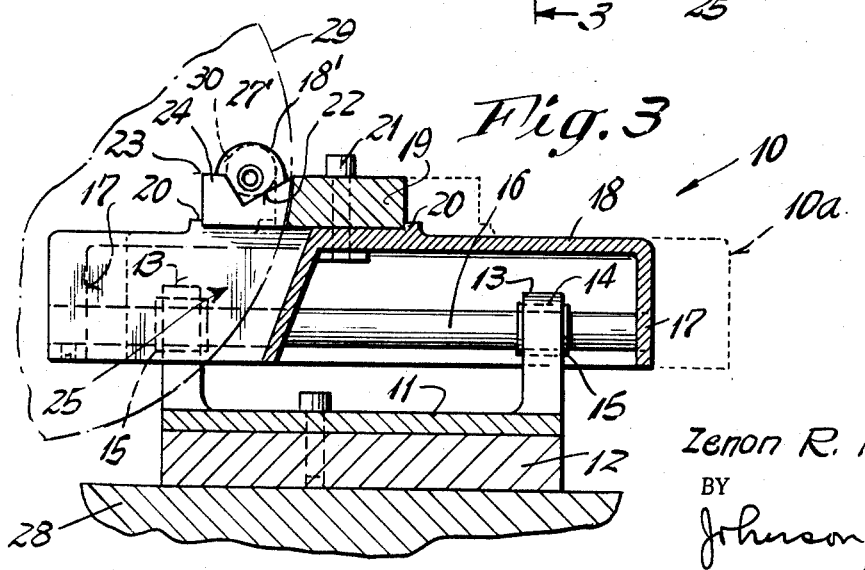
FIG. 3 is a section taken on the line 3—3 of FIG. 2 with the cut-off wheel and grinder bed being diagrammatically represented.

With the end 27' and the fixture 10 located to cut the initial piece of approximately the desired length, the worktable is manually moved from the dotted line position 10a in FIG. 3 to the solid line position against the saw 29. The saw will thus cut a slit 31 in the stabilizing portion 24 and also cut through the material 30 to form the test piece 30a. The piece 30a is then measured to determine the difference between its length and the desired length of the piece. The stop means 26 is then rotated to move the end 27' the distance equal to the difference to thus adjust the distance between the end 27' and the saw blade to cut pieces to the desired length. As the stop means 26 includes the micrometer screw 27, the distance that the end 27' is moved may accordingly be accurately controlled. The user continually reciprocates the worktable from the dotted line position 10a to the solid line position to cut a piece, retracts it to the dotted line position, moves the end of the material 30 against the end 27' and then moves the worktable from the dotted line position 10a to the solid line position to cut a piece. This procedure is repeated for each piece. While the work may be held by a clamp, normally the user is capable of manually holding the work without a clamp.

It will be understood in the present invention that only one saw slit is made in the portion 24 and this slit is utilized to provide for stabilization of the blade as it is forced against the material. After the forming of the slit, the distance between the slit and the end 27' is set to the desired distance by movement of the end with respect to the slit and thus the same slit is utilized for cutting many pieces of the same length.

In practice it has been found that it is desirable to form a new slit for each piece of different length and thus the edge 24 may be formed with many slits. After the formation of many slits a new support 19 may be substituted therefor merely by removal of the screws 21, the positioning of a new support 19 within the abutments 20 and the replacement of the screws 21, as shown in FIG. 3.

It will be appreciated that the saw blade 29 does not engage any other piece of the fixture as the recess 25 of the worktable relieves the worktable from engagement therewith where the saw normally operates. The depending sides of the worktable cover the shafts and apertures to prevent abrasive grit formed during use from being deposited thereon.

It will accordingly be appreciated that there has been disclosed a cut-off fixture which enables a user to cut individual pieces from a length of material with each piece being of substantially identical length. The fixture may be used with a conventional surface grinder having a thin, cut-off saw wheel with the fixture providing for stabilization of the blade during cutting by the saw forming its own stabilizing slit. The length of the pieces may be easily set after only one test piece by the use of a calibrated stop means which enables an end to be moved a known distance with respect to the slit made by the saw.

Variations and modifications may be made within the scope of the claims and portions of the improvements may be used without others.

I claim:
1. A cut-off fixture for use with a thin, cut-off saw blade to cut constant length workpieces from a piece of work comprising a base, a worktable, means mounting the worktable on the base for reciprocating movement towards and away from the edge of the blade, a work support carried by the worktable and having a work carrying groove, said groove being transverse to the direction of movement of said worktable, said work support further including a blade stabilizing portion positioned between the groove and the blade, said blade stabilizing portion being slitless and adapted to have a slit made therein by said blade upon the cutting of a trial length workpiece, stop means mounted on said worktable and having an end face positioned adjacent one end of the groove, and in which the stop means is adjustable to move the end face in alignment with the groove and includes calibrated means for determining the extent of movement whereby said stop means may be adjusted to eliminate the deviation between the length of the trial workpiece and the desired length of the constant length workpieces.

2. The invention as defined in claim 1 in which the means mounting the table on the base includes at least two aligned shafts carried by one member and cooperating apertures formed in the other member.

3. The invention as defined in claim 2 in which there are at least two spaced apart apertures for cooperating with one shaft, one of said apertures being positioned ahead of said groove and the other behind said groove whereby said groove is supported between said apertures.

4. The invention as defined in claim 1 in which the work support is releasably secured to the worktable and means on the worktable for aligning said support with respect to said table.

5. The invention as defined in claim 1 in which the base includes a paramagnetic plate formed of paramagnetic material to enable said fixture to be held by magnetic attraction.

6. The invention as defined in claim 1 in which the worktable extends above and over the mounting means and has depending sides whereby said mounting means is sheltered by said worktable against abrasive grit formed during operation.

References Cited
UNITED STATES PATENTS

| | | | |
|---|---|---|---|
| 1,616,909 | 2/1927 | Lorenz | 143—524 X |
| 2,009,859 | 7/1935 | Robinson | 51—99 X |
| 2,063,236 | 12/1936 | Eisler | 51—92 X |
| 2,709,463 | 5/1955 | Gustin | 143—132 |
| 2,743,717 | 5/1956 | Wilkin | 125—13 |
| 3,205,621 | 9/1965 | Davis | 51—98 |

FOREIGN PATENTS

| | | |
|---|---|---|
| 491,251 | 2/1930 | Germany. |

HAROLD D. WHITEHEAD, *Primary Examiner.*